United States Patent [19]
Allison et al.

[11] Patent Number: 6,137,804
[45] Date of Patent: Oct. 24, 2000

[54] SYSTEM AND METHOD FOR AUTOMATIC RETRY OF TRANSMIT, INDEPENDENT OF A HOST PROCESSOR, AFTER AN UNDERRUN OCCURS IN A LAN

[75] Inventors: Samuel Steven Allison, Fuquay-Varina; Kenneth James Barker; Steven Howard Johnson, both of Cary; Joseph Kinman Lee, Raleigh, all of N.C.

[73] Assignee: International Business Machines Corporation, Armonk, N.Y.

[21] Appl. No.: 08/982,726

[22] Filed: Dec. 2, 1997

[51] Int. Cl.[7] .............................. H04L 12/28; H04L 12/56
[52] U.S. Cl. ............................................. 370/410; 370/445
[58] Field of Search ..................................... 370/410, 235, 370/282, 285, 347, 355, 358, 359, 360, 363, 365, 368, 378, 379, 381, 382, 383, 395, 399, 401, 412, 413, 415, 417, 419, 423, 445, 449, 447, 455

[56] References Cited

U.S. PATENT DOCUMENTS

| | | | |
|---|---|---|---|
| 4,051,355 | 9/1977 | Lin ........................................ | 235/302.3 |
| 4,942,553 | 7/1990 | Dalrymple et al. ..................... | 364/900 |
| 4,945,548 | 7/1990 | Iannarone et al. ...................... | 375/4 |
| 5,434,872 | 7/1995 | Petersen et al. ........................ | 371/57.1 |
| 5,485,584 | 1/1996 | Hausman et al. ....................... | 395/842 |
| 5,548,587 | 8/1996 | Bailey et al. ............................ | 370/395 |
| 5,561,666 | 10/1996 | Christensen et al. ................... | 370/276 |
| 5,594,702 | 1/1997 | Wakeman et al. ...................... | 345/501 |
| 5,602,537 | 2/1997 | Dalrymple ......................... | 340/825.06 |
| 5,623,606 | 4/1997 | Yokoyama et al. ..................... | 395/250 |
| 5,623,700 | 4/1997 | Parks et al. ............................. | 710/53 |
| 5,708,779 | 1/1998 | Graziano et al. ....................... | 709/250 |
| 5,721,841 | 2/1998 | Szczepanek ............................ | 710/130 |
| 5,732,094 | 3/1998 | Petersen et al. ........................ | 370/445 |
| 5,778,175 | 7/1998 | Paul et al. ............................... | 709/250 |
| 5,784,573 | 7/1998 | Szczepanek et al. ................... | 709/250 |
| 5,822,612 | 10/1998 | Thomas et al. ......................... | 710/6 |
| 5,832,238 | 11/1998 | Helms .................................... | 710/105 |
| 5,850,557 | 12/1998 | McTague et al. ....................... | 710/262 |
| 5,864,653 | 1/1999 | Tavallaei et al. ....................... | 395/181 |
| 5,937,169 | 8/1999 | Connery et al. ........................ | 709/250 |

OTHER PUBLICATIONS

IBM Technical Disclosure Bulletin, vol. 37, No. 11, Nov. 1994, pp. 457–458, "Adaptive Prediction Minimizes Data Overrun and Underrun".

IBM Technical Disclosure Bulletin, vol. 33, No. 12, May 1991, pp. 370–371, "Efficient Dual–Port First–In, First–Out Buffer with an Overrun and Underrun Detection Scheme".

*Primary Examiner*—Douglas W. Olms
*Assistant Examiner*—Phirin Sam
*Attorney, Agent, or Firm*—Joseph C. Redmond, Jr.; Joscelyn G. Cockburn

[57] ABSTRACT

In a local area network, a system and a method to detect transmit underruns and retransmit frames between a sending station and a receiving station using a Media Access Control (MAC) device in lieu of a sending processor. The MAC device includes a MAC processor for transmitting data in blocks from a host buffer to a storage device, e.g., RAM for retransmission to the network via a Media Independent Interface (MII) unit. The MAC device includes a transmit logic unit which uses a control word set by the MAC processor to transmit data by frames from the storage device to the network. The transmit logic unit includes pointer control logic to identify the start address of the data and to track the data as read from the storage device to the network. When a transmit underrun occurs, the transmit logic recognizes the condition and resets the pointer logic to the start of the first frame for retransmission to the receiving station. During retransmission, the MAC processor continues to transfer data from the sending system to the storage device which eventually provides sufficient data to overcome the underrun condition. A frame is repeated if a underrun condition continues until the frame is transmitted without an underrun condition which eliminates the retransmission request of the receiving station to the sending station. The MAC device enables underruns to be transparent to the sending and receiving station.

15 Claims, 5 Drawing Sheets

FIG. 1 - Prior Art

Transmit Logic Block Diagram

Tx RAM Control Word format

SYSTEM AND METHOD FOR AUTOMATIC RETRY OF TRANSMIT, INDEPENDENT OF A HOST PROCESSOR, AFTER AN UNDERRUN OCCURS IN A LAN

RELATED APPLICATION

Copending application entitled "A System And Method For Avoiding Host Transmit Underruns In A Communication Network", Ser. No. 08/966,278, filed Nov. 7, 1997, assigned to the same assignee as that of the present invention.

BACKGROUND OF THE INVENTION

1. Field of the Invention

This invention relates to communication systems. More particularly, the invention relates to a Local Area Network (LAN) in which automatic retry of a transmit, independent of a host processor, occurs after an underrun condition exists in the LAN.

2. Description of Prior Art

In local area networks in which a host system is coupled to the network through a Peripheral Component Interconnect (PCI) and a Media Access Control (MAC) device, a transmit underrun occurs when the network reads data faster from the MAC device than the PCI bus transfers data to the MAC device. Due to the poor performance of the PCI bus in many PC's or host systems available today, MAC devices can have difficulty moving data from the host system across the PCI bus to a transmit storage device in the MAC device fast enough to keep data flowing across the network interface. Often delay states are introduced on the PCI bus by the host system adding time to the transfer. The initial time causes the data to be read out of the transmit storage device on the network side, faster than data is written into the storage device on the system side. If the data being written in to the transmit storage device is at a slower rate than being taken out, a transmit underrun can occur. If the transmit underrun occurs, the host software is responsible for re-initiating transmit of the frame. Typically, the receiving station would detect that a frame was missing. The station would then send a request back to the sending station that had the underrun asking for a retransmit of the frame and all subsequent frames in the sequence. Typically, the order of the frame sequence must be maintained. The host system for the sending station would process requests and re-queue the frame or sequence of frames for transmission which degrades performance of the system.

Prior art related to underrun conditions in local area networks include the following:

U.S. Pat. No. 4,942,553 issued Jul. 17, 1990, discloses detecting a fill or empty level of a storage device in a local area network. When a fill or empty level exceeds a first request level, notification is made to a Direct Memory Access (DMA) or a coprocessor. The fill or empty level is compared to a second request level and once that level exceeds the second level, notification to the CPU is generated. In most cases, the DMA or coprocessor is able to obtain control of the bus before the CPU interrupt is reached, thereby preventing waste or CPU intervention as well as transmit storage overrun/underruns.

U.S. Pat. No. 4,945,548 issued Jul. 31, 1990, discloses detecting impending overflow and/or underrun conditions of an elasticity buffer. Write overflow or read underrun of a storage element is detected before any data corruption can occur by comparing an input and output pointer. Another condition occurs if the input/output pointers overlap for a threshold period, which can be shorter than the period required for writing or reading of a multi-bit data unit to or from the buffer. The overlap time period is determined by comparing the pointers at one or more sampling times corresponding to the selected phase of the clock.

IBM Technical Disclosure Bulletin (TDB) published November, 1994, pages 457–458, discloses a device control program that manages the flow of data from a data server to a buffer output device such that the data is received at the device slightly before the device finishes with the previous data. A network-delay and an output-read are measured empirically by a device control program and adaptively adjusted at a rate of allowable underrun and overrun dictated by a print system.

IBM TDB published May, 1991, pages 370–371, discloses a technique for detecting overruns and underrun conditions in a communication network while guaranteeing the data integrity of a storage buffer.

None of the prior art disclose a LAN in which a MAC device makes transmit underrun conditions transparent to sending and receiving stations using transmit logic means for tracking each frame transmitted and re-transmitting the frame upon an underrun independent of a host processor.

SUMMARY OF THE INVENTION

An object of the invention is a system and method for automatic retry of a transmit in a MAC device after an underrun occurs in a local area network.

Another object is a system and method for automatic retry of a transmit in a MAC device independent of a host processor after an underrun occurs in a local area network.

Another object is a MAC device using transmit logic to monitor and re-transmit a frame independent of a host processor when a transmit underrun occurs in a local area network.

Another object is a LAN with improved performance due to automatic retry of transmit.

Another object is a LAN with improved performance due to the automatic retransmission of a frame after an underrun.

These and other objects, features and advantages are achieved in a system and method for automatically initiating a retry of host transmit data to a communication network independent of a host system processor after an underrun of host data occurs. The host system is coupled to the communication network via a Peripheral Component Interface (PCI) device and a Media Access Control (MAC) device. The host system includes host software, device driver, transmit frame descriptors and host buffers. The MAC device includes a processor, transmit logic, a transmit storage device and a communication interface, e.g. a medium independent interface (MII) coupled to the network, e.g. a LAN. The MAC processor transfers host data from the host buffer to the transmit storage device using a host descriptor to locate and transfer the data in host memory. Data is transferred out of the transmit storage to the MII under control of the transmit logic. When an underrun of host data occurs in the transmit storage device, the transmit logic automatically initiates the re- transmission of the last frame in the storage device independent of the host processor. Simultaneously, the MAC processor continues to move data from the host buffer to the transmit storage device. By the time the transmit logic begins re-transmitting the frame, more data is available in the transmit storage device. The availability of the data in the transmit storage device lowers the probability of an underrun interrupting the retransmission. If an underrun still occurs, another retransmission will be done. Eventually, there will be enough data in the transmit storage device to prevent an underrun or the whole frame will be in the storage device which will prevent an underrun from occurring at all. These re-transmissions are done without informing the host software that a transmit underrun has occurred resulting in the underrun being transparent to the sending and receiving stations on the LAN.

DESCRIPTION OF THE DRAWING

The invention will be further understood from the following detailed description of preferred embodiment, taken in conjunction with an appended drawings, in which.

DESCRIPTION OF A PREFERRED EMBODIMENT

Figure 1:
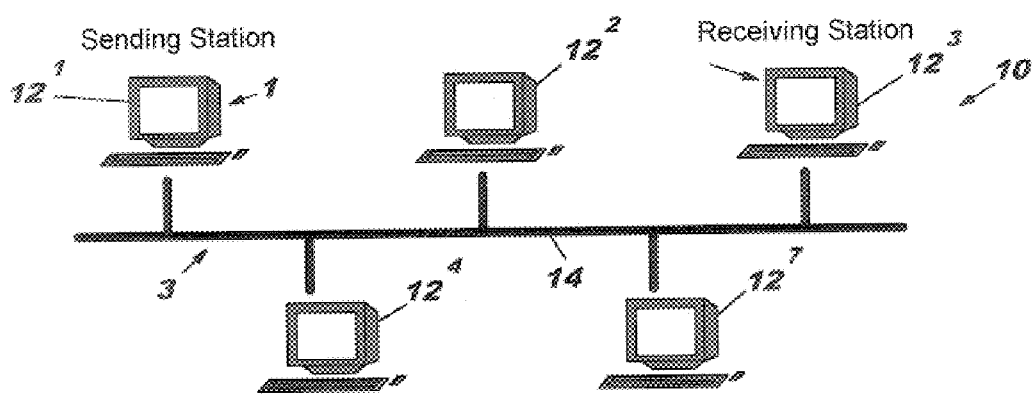
FIG. 1 is a representation of a prior art Local Area Network (LAN) including sending and receiving host stations coupled to a transmission medium through internal adapters (not shown).

In FIG. 1, a prior art Local Area Network (LAN) 10, for example, an Ethernet, Token Ring, or the like, includes a station $12^1 \cdots, 12^n$, typically a Personal Computer (PC) or the like including an adapter (not shown) coupled to a transmission medium 14, for example, cable, optical fiber, wireless link, or the like, for data communication among the stations. The present invention is directed to improving the performance of the network by retransmitting any frame that was interrupted due to a transmit underrun, thereby preventing the receiving station software from timing out and requesting retransmission of the frame. Otherwise, when a transmit underrun occurs, the transmission of data between sending and receiving stations would be delayed degrading the performance of the network. The present invention is further directed to handling transmit underruns in the sending station independent of the PC whereby the underrun is transparent to the sending and receiving stations.

Figure 2:
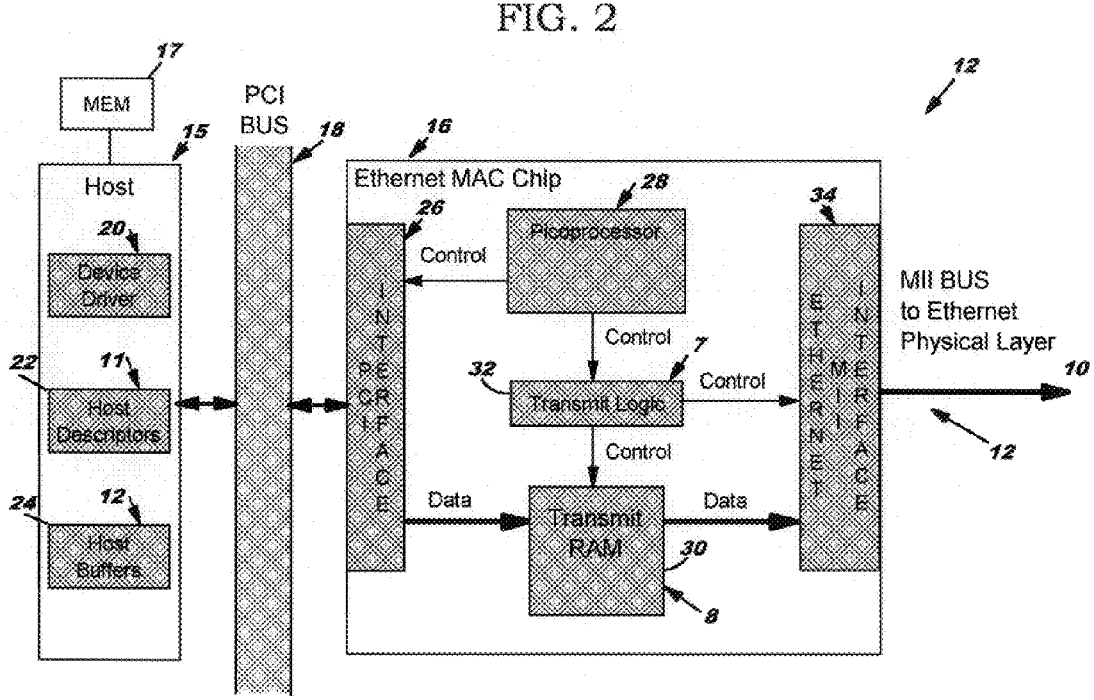
FIG. 2 is a block diagram of a host system; peripheral component interconnect (PCI) bus and MAC device in a station included in the system of FIG. 1 and incorporating the principles of the present invention.

In FIG. 2, a station 12 is shown in more detail. The station 12 includes a host processor 15 coupled to a Media Access Control (MAC) device or chip 16 through a Peripheral Component Interface (PCI) bus 18. The PCI bus regulates the transfer of data between the host 15 and the MAC device 16. The host 15 includes a device driver 20, transmit frame descriptors 22 and host buffers 24 for exchanging data in a host memory 17 with the network 10 via the device 16 and the bus 18.

The device 16 includes a picoprocessor 28 for controlling the PCI bus 18 in transferring data from the host buffer to a transmit storage device 30, for example, a dynamic Random Access Memory (RAM) or the like. The device 30 provides data to an interface 34, e.g., a Media Independent Interface (MII) for transfer to the physical layer of the network 10. The interface 34 is under the control of transmit logic 32 which implements control programs run by the MAC processor 28.

The device driver 20 in the form of host software serves as a link between the host operating system and the MAC device 16. The device driver presents the host operating system with a set of functions which the operating system can call upon to perform data processing operations. The device driver translates these functions into specific sets of instructions the MAC device requires to operate. The transmit frame descriptors 22 describe the data to be removed from host memory 15 for transmission to the network or vice-a-versa. The transmit frame descriptor links multiple data buffers in the host memory to form a frame for transfer to the storage device 30 under the control of the MAC processor 28.

Figure 3:
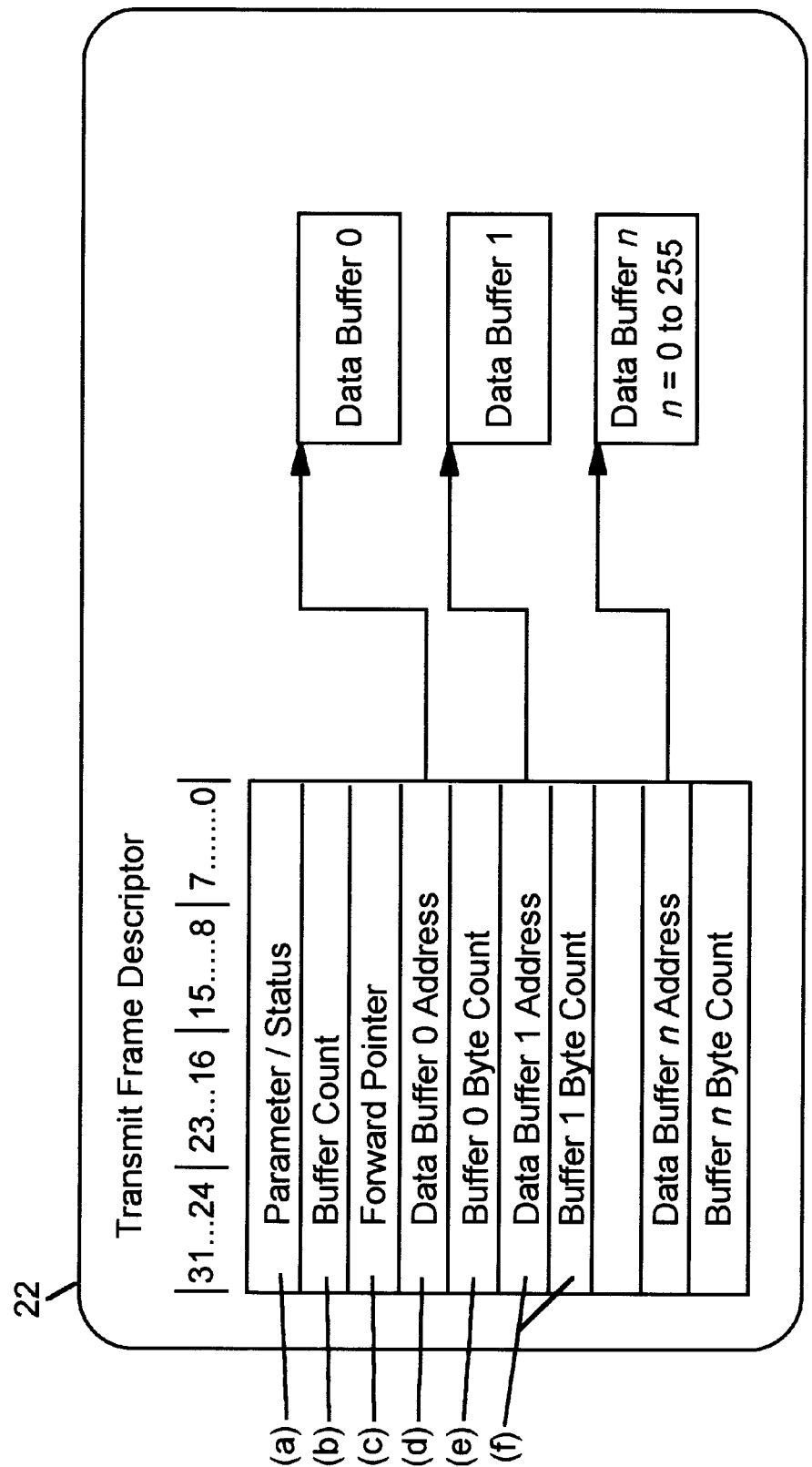
FIG. 3 is a representation of a host descriptor in the host system of FIG. 2 for directing the flow of host data to the MAC device of FIG. 2.

In FIG. 3, a host descriptor, in one form, comprises 32 bits in the following fields:

1) A parameter/status field 22(a) contains the frame's status after the frame has been transferred from host memory to the host buffer 24. The status contents of this field are used by the device driver software to determine the status of the transmitted frame. The parameter contents are set by the device driver to indicate information to the MAC on how the data movement should be handled.

2) A buffer count field 22(b) contains the number of data buffers used to form the frame being transmitted. This field is set by the device driver before transmission starts and can contain any 32 bit value, including zero.

3) A forward pointer frame 22(c) contains the host memory address of the next transmit frame descriptor queued for transmission. This field is set by the device driver and is used by the MAC. Using this pointer, the next frame queued for transmission can be located in the host memory.

4) A data buffer address field 22(d) contains the host memory starting address of the data buffer for all or part of the frame to be transmitted. This field is set by the device driver and is used by the MAC device for locating the frame content. Each buffer associated with a descriptor has a data buffer address and a buffer byte count field located in the descriptor.

5) A buffer byte count field 22(e) contains the number of bytes in the associated buffer that will be transferred from the buffer by the MAC. This field is set by the device driver and used by the MAC. Each buffer associated with the descriptor has a data buffer address field and a buffer link field located in the descriptor.

6) A data buffer field address and byte count 22(f) for each frame or partial frames to be transmitted. The structure is built by host software and used by the MAC device as a source of data to be transmitted.

7) A frame transmit threshold field is generated by the device driver and represents the last 8-bits of the parameter/status field 22(a). The parameter/status field also includes a bit reserved as a "retry bit" for the MAC device when the MAC device cannot provide data to the network that is required to maintain transmission.

The process for transferring data from the host memory 17 to the storage device 30 is further described in a copending application entitled "A System And Method For Avoiding Host Transmit Underruns In A Communication Network", Ser. No. 08/966,278, filed Nov. 7, 1997 (RA9-

97-061), assigned to the same assignee as that of the present invention and fully incorporated herein by reference.

In 100 Mbps. Ethernet systems, transmit underruns are a significant problem due to the MAC device having difficulty moving data from the host buffer 24 across the PCI bus 18 to the transmit storage device fast enough to keep data flowing across the MII interface 32 to the transmission media 14. Often delay states are introduced into the bus 18 by the host 15 adding time to the transfer. Such delay states cause the data to be read out of the transmit storage device 30 faster than written into the device on the host side. If the data being written in to the device 30 occurs at a slower rate than being transmitted to the network, a transmit underrun can occur. If the transmit underrun occurs, the host software is responsible for re-initiating transmit of the frame. Typically, a receiving station $12^1$ (see FIG. 1) would detect that a frame was missing. The receiving station would send a request back to the sending stations $12^3$ (see FIG. 1) requesting a retransmit of the frame and all subsequent frames in the sequence. The sending session would process the request and re-queue the frame or sequence of frames for retransmission to the receiving station.

In order to bypass the overhead involved with the host software re-initiating a transmit to the device driver after a transmit underrun occurs, the present invention uses the MAC device and not the device driver to re-transmit the frame.

Once a transmit underrun occurs, the transmit logic 32 initiates another transmission of the same frame. During this time, the MAC processor 28 continues to move data from the host buffer 24 to the storage device 30. By the time the transmit logic begins retransmitting the frame, more data is available in the transmit storage device because the MAC processor 28 continues moving data from the host buffer to the storage device 30. The continuous data flow between the buffer and the storage device lowers the probability of an underrun during the retransmission. If an underrun still occurs, another retry will be performed by the MAC device. Because data is still being moved into the transmit storage device during this time, eventually there will be enough data in the storage device to prevent an underrun or the whole frame will be in the storage device which will prevent an underrun from occurring at all.

The retransmissions performed by the MAC device are executed without informing the host software that a transmit underrun occurred. No transmission requests by the receiving stations are necessary due to the frames that are not delivered due to an underrun. Therefore, the sending station $12^1$ would not have to process a retransmission request and submit a new transmission to the device driver. This process results in a net increase in performance because no frames after the current ones are transmitted until the current frame is transmitted successfully. This causes less processing by the host software in both the sending station and the receiving station as the underruns are kept transparent to them.

Figure 4:
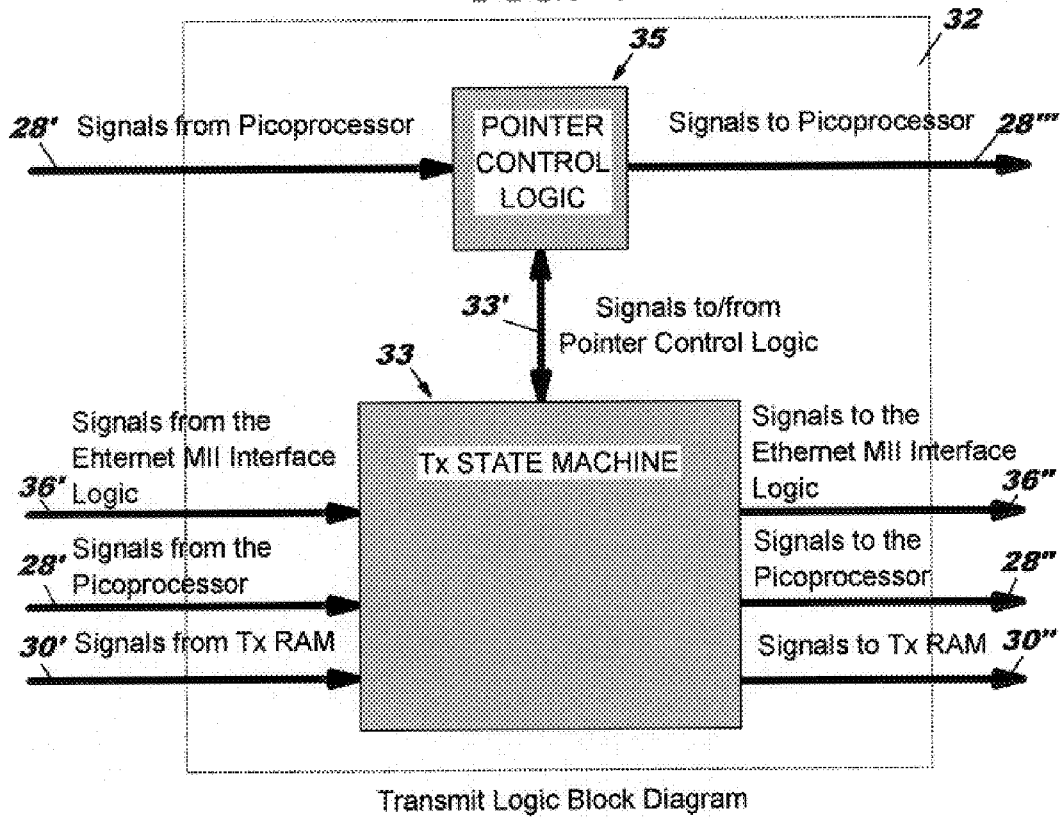
FIG. 4 is a block diagram of transmit logic included in the MAC device of FIG. 2 for controlling the flow of data from the MAC device to the network independent of the host system.

In FIG. 4, the transmit logic 32 for controlling movement of data from the transmit storage device 30 to the network 10 includes a Transmit State Machine (TSM) 33 and pointer control logic 35. The state machine is a logic device for controlling the transfer of data from the storage device to the MII 34 for subsequent transfer to the network 10. The pointer control logic is a logic device having three pointers: A trail read pointer that remains at the start of frame location, a lead read pointer that follows each word of data as it is read from the storage device, and a write pointer that indicates where data has been written into the storage device. The trail read pointer indicates the start of a frame transferred to the MII interface logic. The lead read pointer tracks each word of data as read from the storage device. The write pointer is controlled by the MAC processor and is incremented as each block of data is written into the storage device.

The TSM interfaces with the MAC processor 28, the storage device 30, the MII interface logic 34, and the pointer control logic 35. The TSM receives control information from the MAC processor and provides status back to the MAC processor. The TSM interfaces with the storage device to read control words and transmit data. The TSM interfaces with the MII interface logic 34 to delineate frame boundaries and pass data to the interface to be transmitted to the network 10. The TSM interfaces with the pointer control logic 35 to control the lead read and trail read pointers, and to receive a control signal that indicates that data is available in the storage device to be transmitted.

Figure 5:
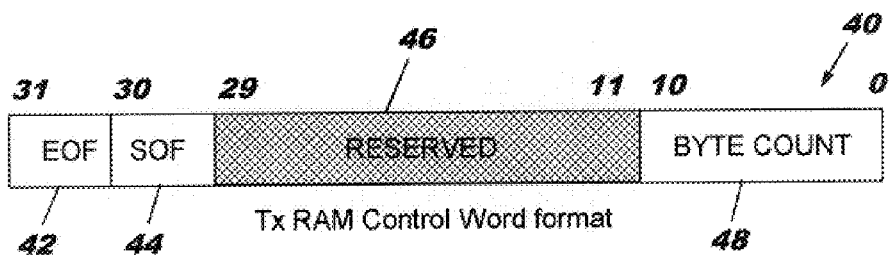
FIG. 5 is a representation of a transmit control word used in the operation of the transmit logic of FIG. 4.

In FIG. 5, the control word 40 is built by the MAC processor and placed in the storage device for transferring data from the host buffer to the storage device on a block basis. In one embodiment, the control word is a 32-bit word comprising an End-Of-Frame (EOF) field 42; a Start-Of-Frame (SOF) field 44; a reserved field 46; and a byte count field 48.

The state machine 33 uses and provides the following signals in transferring data from the storage device 30 to the interface 34:

(a) Receiving signals 36' from the interface 34 for recording the status of a transmit frame in the interface 34.

(b) Receiving signals 30' from the storage device for requests to read data from the storage device 30.

(c) Receiving signals 28' from the MAC processor 28 for directing the transfer from the storage device 30 to the interface 34.

(d) Providing signals 36" to the interface identifying the frames transferred from the storage device to the interface.

(e) Providing signals 28" to the MAC processor 28 indicating the status of frames transferred from the storage device to the interface.

(f) Providing signals 30" to the storage device with grants to read control words and data to be transferred from the storage device to the interface.

(g) Exchanging signals 33' between the TSM and the control logic 35 to set the trail read and lead read pointers for tracking the transfer of data from the storage device to the interface and redirecting the pointer logic to rewind the trail read and lead read pointers to the same address when a transmit underrun occurs in the storage device.

(h) Receiving signals 28' from the MAC processor 28 at the pointer control logic 35 to set the write pointer for data to be read out of the host buffer and written into the storage device. The logic 35 provides signals to the MAC processor 28''' to advise the processor of the status of the data being transferred from the storage device to the interface.

The MAC processor moves the data to be transmitted from the host buffer 24 into the storage device 30. The MAC processor places the control word 40 in front of each block of data that is in the storage device. The control word 40 tells the TSM if the block is for the start of the frame, or end of the frame or the middle of the frame. The control word also gives a byte count of the size of the block. Once the block of data is in the storage device 30 with a control word, the MAC processor 28 increments the write pointer in the pointer control logic. Once the write pointer is incremented, a control signal from the pointer control logic indicates to the TSM that there is data to be transmitted to the interface.

At that time, the TSM reads the control word 40 from the storage device 30, and the trail read pointer is set to the start of frame location. Next the TSM reads the first word of data of the block from the storage device and signals the MII that the frame has started, and passes the data to the MII for transmission to the network 10. The TSM reads each word from the storage device and passes the word to the MII interface logic, while incrementing the lead read pointer for each word read from the storage device. The TSM tracks when one block of data ends and the next begins by decrementing the byte count for the current block. Once the byte count is zero, the TSM begins reading the data from the next block and passing the data to the MII. The TSM will recognize the last block of data of a frame by the EOF bit 42 (see FIG. 5) being set in the control word 40. Once the last word of the last block of the frame has been transferred, the TSM will indicate to the MII that the frame has ended. The TSM will indicate the EOF to the MAC processor 28 and return to an idle state waiting for another block of data to become available to the storage device.

Figure 6:
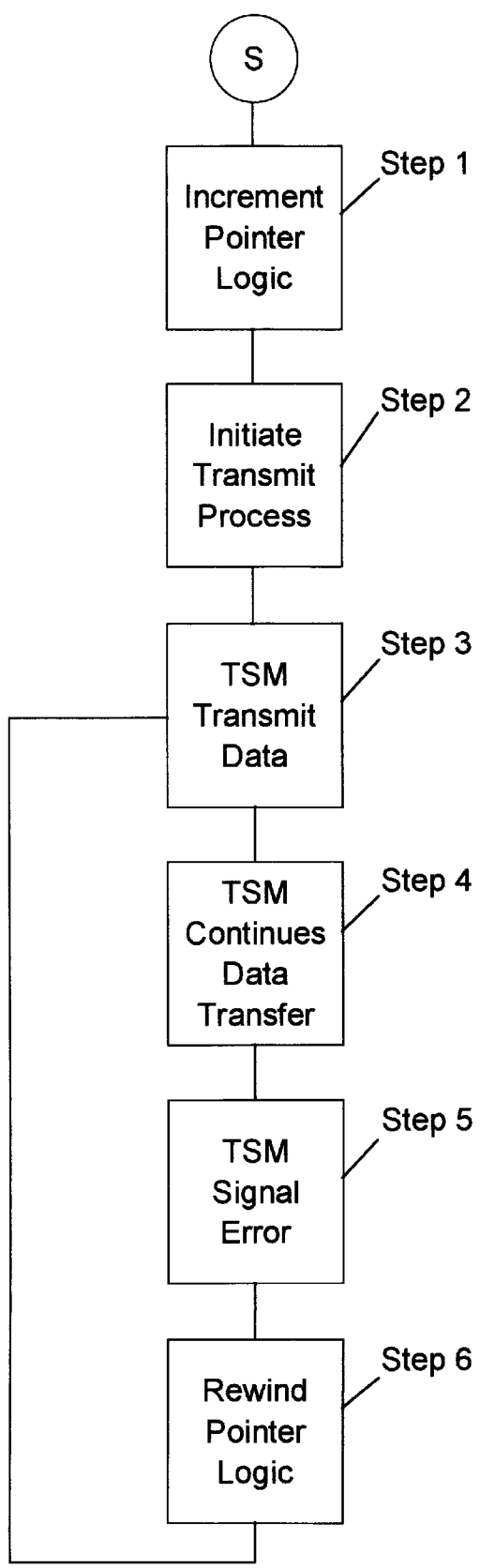
FIG. 6 is a flow diagram of the transmit logic of FIG. 4 for automatically re-sending a frame when a transmit underrun occurs on the system of FIGS. 1 and 2.

FIG. 6 summarizes the operation of the transmit logic unit 32 in transferring data from the storage device 30 to the MII 34, as follows:

In step 1, the state machine 33 will increment the write pointer in the pointer control logic once the MAC processor 28 has moved a block of data into the storage device 30. At this point the pointer control logic 35 will signal that the storage device is not empty.

In step 2, the state machine will recognize the storage device is not empty and will initiate a transmit process by reading the transmit control word 40 that is at the current read address. At this point the trail read and lead read pointers will be set to the same read address in the storage device 30.

In step 3, the state machine will read the first data word and will signal the start of a frame and pass the data to the interface 34, with the lead read pointer incremented with each word read.

In step 4, the state machine will continue to transfer data to the interface logic until it has transferred the last data for the frame or the interface logic detects an error, such as a transmit underrun in the storage device. A storage underrun occurs if the state machine stops transferring data to the interface during a frame. This happens if the rate at which the MAC processor 28 is able to move data into the storage device is less than the rate at which the TSM transfers data to the MII. The process of transferring data is stopped if the storage device becomes empty due to the data coming into the storage device from the PCI bus slower than it is getting read out of the storage device by the TSM for transfer to the MII interface logic. When this happens, the transmit state machine must wait for data to be put into the storage device by the MAC processor. If this happens, the transmit state machine will signal a transmit underrun.

In step 5, when a transmit underrun occurs, the state machine will terminate transmission of a frame by signalling the error to the interface logic.

In step 6, the transmit state machine will signal the pointer control logic to rewind its lead read pointer. The pointer control logic will move the lead pointer back to the location of the trail read pointer. At this time the state machine will automatically start to transmit the same frame again by reading the first control word and then the first word of data, signalling the start of a new frame to the MII and returning to step 3. If an underrun still occurs, another retry will be done by the transmit logic until data is moved into the storage device sufficient to prevent an underrun or the whole frame will be in the storage device which will prevent an underrun from occurring at all. Retransmissions are automatically done without informing the host 16 that a transmit underrun occurs. The transmit attempts continue until the frame is transmitted without an underrun. The automatic retry results in a net increase in performance of the system because no frame after the current ones are transmitted until the current frame is transmitted successfully. This process results in all frames being successfully transmitted to the receiving station. No retransmission requests by the receiving stations are necessary due to frames that are not delivered due to an underrun in the sending station. As a result, the sending station will not have to process a retransmission request and issue a new transmission to the device driver. The performance of the network is increased in that transmit underruns are kept transparent to the sending and receiving stations.

Summarizing, a MAC device handles transmit underruns for a local area network without the necessity of a receiving station sending a request to a sending station when an underrun occurs indicating frames are missing in the data communication. The elimination of retransmission communications between a receiving station and a sending station improves network performance. The MAC device uses a transmit logic unit responsive to a MAC processor to control the transfer of data from a storage device to a network interface, both in the MAC device. The transmit logic unit includes a transmit state machine (TSM) and a transmit control word for transferring blocks of data from the storage device to the interface. Pointer control logic indicates to the TSM the start of a frame and each word read from the storage device. When an underrun occurs, the TSM automatically resets the pointer control logic to retransmit the frame until the underrun condition is eliminated.

While the underrun condition exists, the MAC processor continues to transfer data to the transmit storage device until eventually the end of run has occurred and the resumption of frame transmission is established.

While the invention has been shown and described in connection with a preferred embodiment, various modifications may be made therein without departing from the spirit and scope thereof, as defined in the appended claims, in which:

We claim:

1. In a communication network, a system for detecting transmit underruns in a data transmission and retransmitting the data to a receiving station from a sending station independent of a host system in the sending station, comprising:

a) a Media Access Control (MAC) device coupled to the host system and including a processor, transmit logic, a transmit storage device, and a communication interface coupled to the communication network;

b) host descriptor means for transferring the data in frames from the host system to the transmit storage device under control of the processor;

c) control word means for transferring the data in frames from the transmit storage device to the network via the communication interface until the last data for the frame has been transferred or a transmit underrun condition is detected in the storage device;

d) means for rewinding a pointer control unit in the transmit logic to the start of a frame when an underrun condition is detected; and e) means for detecting the transmit underrun condition and retransmitting the last frame in the storage device without retransmitting the frame from the host system.

2. The system of claim 1 wherein the transmit logic means for controls the transfer of data from the storage device to the communication interface using the control word.

3. The system of claim 1 wherein the transmit logic includes a transmit state machine and pointer control logic for transferring data from the storage device to the communication interface in response to the processor, the pointer logic including a trail read pointer a lead read pointer, and a write pointer.

4. The system of claim 3 further comprising:
  a) signal means generated by the transmit state device for controlling the pointer logic when a transmit underrun condition occurs in the storage device.

5. The system of claim 1 further comprising:
  a) transmit state machine means responsive to the processor for controlling the communication interface in the transfer of data from the storage device to the network.

6. The system of claim 1 wherein the
  a) control word means defines the start of frame; end of frame; byte count and data transferred from the storage device to the communication interface.

7. The system of claim 1 further comprising:
  a) means for automatically retrying the last frame in the storage device transmitted to the network when a transmit underrun condition is detected in the storage device.

8. The system of claim 1 wherein:
  a) the processor is coupled to the transmit logic unit and a peripheral component interconnect interface for and generates a control word for control purposes in transferring data from the host system to the storage device.

9. The system of claim 1 wherein;
  a) the transmit logic unit includes a state machine and pointer control logic and is coupled to the transmit storage device and the communication interface for controlling the transfer of data from the transmit storage device to the network.

10. The system of claim 1 wherein:
  a) The transmit storage device is further coupled to a peripheral component interconnect interface and the communication interface for transferring frame data once from the host system to the network under control of the transmit logic unit.

11. In a local area network, a host system coupled to a communication network via a communication bus and a media access control (MAC) device, the host system including a device driver; host descriptor, and host buffer; the MAC device including a processor; transmit storage device, transmit logic and a network interface, a method for detecting transmit underruns of host data and retransmitting frames to the communication network independent of the host using the MAC device, comprising the steps of:
  a) transferring data in frames from the host buffer to the transmit storage device under control of the processor; each frame being transmitted only once from the host buffer to the transmit storage device;
  b) transferring data from the transmit storage device to the interface under control of the transmit logic until the last data for the frame has been transferred or the interface detects an underrun in the transmit storage device;
  c) indicating the start of a frame location in the transmit storage device and each word of data read from the transmit storage device using the transmit logic;
  d) rewinding a pointer control unit in the transmit logic to the start of a frame when an underrun condition is detected;
  e) re-transmitting the last frame transmitted in the transmit storage device upon an underrun; and
  f) signaling the start of a new frame to the interface whereby transmit underruns are independent of the host system.

12. The method of claim 11 further comprising the step of:
  a) continuing the transfer of frames to the storage from the host buffer when an underrun condition is detected.

13. The method of claim 11 further comprising the step of:
  a) transmitting signals to a transmit state machine using pointer control logic to control the transfer of data from the storage device to the interface.

14. The method of claim 11 further comprising the step of:
  a) exchanging signals between a pointer control logic unit and a transmit state machine by rewinding pointers to control the transfer of data from the storage device to the network.

15. An adapter for detecting transmit underruns in a data transmission and retransmitting the data to a network independent of a host system, comprising:
  an interface connected to the host system;
  processor means coupled to the interface;
  storage means coupled to the interface and to the network;
  host descriptor means for transferring the data in frames from the host system to the transmit storage device under control of the processor;
  control word means for transferring the data in frames from the transmit storage device to the network until the last data for the frame has been transferred or a transmit underrun condition is detected in the storage device;
  means for rewinding a pointer control unit in the transmit logic to the start of a frame when an underrun condition is detected: and
  'means for detecting the transmit underrun condition and retransmitting the last frame in the storage device without retransmitting the last frame from the host system.

* * * * *